May 26, 1925.  
L. M. PERKINS  
GENERATOR  
Original Filed Jan. 3, 1921  
1,539,406
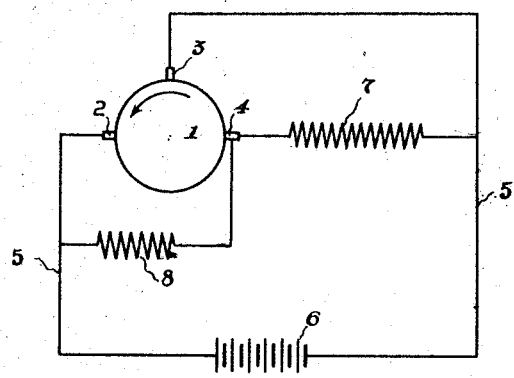
Inventor  
L. M. Perkins  
By Ramsay Hoguet  
Attorney

Patented May 26, 1925.  1,539,406

UNITED STATES PATENT OFFICE.

LAURENCE M. PERKINS, OF SYRACUSE, NEW YORK, ASSIGNOR OF ONE-HALF TO OWEN DYNETO CORPORATION, OF SYRACUSE, NEW YORK, A CORPORATION OF NEW YORK.

GENERATOR.

Original application filed January 3, 1921, Serial No. 434,528. Divided and this application filed April 16, 1924. Serial No. 707,013.

*To all whom it may concern:*

Be it known that I, LAURENCE M. PERKINS, a citizen of the United States, and a resident of Syracuse, New York, have invented an Improvement in Generators, of which the following is a specification.

This invention relates to variable speed generators, with particular reference to third brush generators, and is a division of my application, Ser. No. 434,528, filed January 3, 1921, on generators.

The primary object of this invention is to improve the efficiency, commutation and characteristics of third brush generators.

Reference is here made to my co-pending application for generators, Ser. No. 418,181, filed October 20, 1920, and this present invention contemplates certain improvements thereon in that, while the output characteristic curve of the machine of said co-pending application is substantially fixed in shape, the construction of the generator of the present invention, provides the possibility of change, to a certain extent, of the characteristic curve to meet particular conditions, for example, to increase the ampere output under high motor speed as compared with the generator of said co-pending application.

A further object of the invention is to provide a means whereby the inherent electrical characteristics of the armature are employed to control the current flow in the exciting field.

Other objects and advantages of this invention will be apparent to those skilled in the art, from the following description, taken in conjunction with the accompanying drawings, in which:

The figure is a diagrammatic view of the invention.

Referring to the drawings, the generator comprises an armature 1 provided with brushes 2, 3 and 4; brush 2, which I will call a main brush, being positioned or set substantially on neutral, while brush 3, which I also term a main brush, is set less than 180 electrical degrees from the main brush 2 in the direction of rotation of the generator from its neutral, the angular position of the brush 3 being determined by the generator design and the desired output, but the brush 3 is placed in such position in the field form that the field density at that point is relatively low instead of being placed in the maximum field density, as is the case in the customary third brush machine.

The brush 4, which is the auxiliary brush, is positioned or set, substantially on the other neutral point, opposite the main brush 2.

The main circuit, load or external source of potential, is connected to the brushes 2 and 3, as shown by 5, and a battery or other source of potential 6 is provided in line 5.

7 designates a field winding which is energized from the armature 1 through brushes 3 and 4.

In combination with the machine so far described, I provide an additional field 8, which is connected in shunt across the brushes 2 and 4.

With the arrangement shown and described, the field 7 may be so designed that at the higher speed, with brush 2 positive, the brush 3 may become negative with respect to brush 4, thus causing the current in field 7 to reverse, although the combined strength of fields 7 and 8 must never reverse.

From the above description it is believed that the invention will be apparent to those skilled in the art to which it appertains, but I desire it understood that the drawings and the disclosure are for illustrative purposes only and that various changes may be made within the scope of the appended claims without departing from the spirit of the invention.

What I claim as new and desire to secure by Letters Patent of the United States is:

1. The combination with a variable speed generator in which the main circuit is connected to two brushes, one of which is substantially on neutral and the other of which is off neutral at a point of relatively low field density, of a third brush substantially on the other neutral point, a field connected between the brush which is off neutral and said third brush, and a second field winding connected across the two brushes on the neutral points.

2. The combination with a variable speed generator in which the main circuit is connected to two brushes, one of which is substantially on neutral and the other of which is off neutral in the direction of rotation to such an extent that the angle between the two brushes is less than 180 electrical degrees a third brush substantially on the other neutral point, and a shunt field connected between the brush which is off neutral and said third brush, of a shunt field winding connected directly across the two brushes on the neutral points.

3. The combination with a variable speed generator in which the main circuit is connected to two brushes, one of which is substantially on neutral and the other of which is off neutral to such an extent that the angle between the two brushes is between 60 and 180 electrical degrees, a third brush substantially on the other neutral point, a shunt field winding connected between the brush which is off neutral and said third brush, and a shunt field winding connected directly across the said two brushes on the neutral points.

4. A generator comprising, in combination, an armature, a main brush substantially on a neutral point, a second main brush off neutral, a power circuit connected between said two main brushes, a third brush substantially on the other neutral point, a field winding between said off neutral brush and said third brush, and a shunt field winding connected across the two brushes substantially on the neutral points.

In testimony whereof, I have signed my name to this specification this 19th day of March, 1924.

LAURENCE M. PERKINS.